(12) United States Patent
Kohama

(10) Patent No.: US 10,103,623 B2
(45) Date of Patent: Oct. 16, 2018

(54) SEMICONDUCTOR INTEGRATED CIRCUIT

(71) Applicant: FUJI ELECTRIC CO., LTD., Kawasaki-shi, Kanagawa (JP)

(72) Inventor: Takanori Kohama, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/475,241

(22) Filed: Mar. 31, 2017

(65) Prior Publication Data
US 2017/0338737 A1 Nov. 23, 2017

(30) Foreign Application Priority Data

May 20, 2016 (JP) .................................. 2016-101643

(51) Int. Cl.
| | | |
|---|---|---|
| *H02M 1/00* | (2006.01) | |
| *H02M 3/156* | (2006.01) | |
| *H02M 3/158* | (2006.01) | |
| *F02P 3/055* | (2006.01) | |
| *F02P 9/00* | (2006.01) | |
| *F02P 11/00* | (2006.01) | |

(52) U.S. Cl.
CPC .......... *H02M 3/156* (2013.01); *F02P 3/0552* (2013.01); *F02P 9/002* (2013.01); *F02P 11/00* (2013.01)

(58) Field of Classification Search
CPC ........ H02M 1/08; H02M 1/081; H02M 1/083; H02M 3/158; H02M 3/156; F02P 11/00; F02P 13/00; F02P 3/055; F02P 3/0552; F02P 3/0556
See application file for complete search history.

(56) References Cited

U.S. PATENT DOCUMENTS

| | | | | |
|---|---|---|---|---|
| 5,970,964 A | * | 10/1999 | Furuhata ............... | F02P 3/0552 123/644 |
| 6,100,728 A | * | 8/2000 | Shreve ............... | H03K 17/0826 327/110 |
| 6,378,514 B1 | * | 4/2002 | Kaminaga ............. | F02P 3/0552 123/633 |
| 6,595,194 B1 | * | 7/2003 | Ito ......................... | F02P 3/0435 123/644 |

(Continued)

FOREIGN PATENT DOCUMENTS

JP        2014-238024 A       12/2014

*Primary Examiner* — Adolf Berhane
*Assistant Examiner* — Sisay G Tiku
(74) *Attorney, Agent, or Firm* — Rabin & Berdo, P.C.

(57) ABSTRACT

A semiconductor integrated circuit for controlling a power switch in accordance with a control signal, which is at one of a first level and a second level for respectively turning on and off the power switch. The semiconductor integrated circuit includes a control circuit configured to receive the control signal to thereby output a reference voltage, a value of which gradually drops from a predetermined value when the received control signal remains at the first level for a predetermined time, a current sensing circuit configured to sense a current flowing through the power switch, and a drive circuit configured to receive the control signal and the reference voltage to thereby output a drive signal, the drive signal limiting the current flowing through the power switch in accordance with the reference voltage and a sense voltage corresponding to the current sensed by the current sensing circuit.

5 Claims, 9 Drawing Sheets

(56) References Cited

U.S. PATENT DOCUMENTS

| | | | |
|---|---|---|---|
| 9,719,479 B2* | 8/2017 | Ishii | F02P 3/0453 |
| 9,771,916 B2* | 9/2017 | Ishii | F02P 3/0552 |
| 2004/0011342 A1* | 1/2004 | Fukatsu | F02P 3/0435 |
| | | | 123/630 |
| 2005/0162798 A1* | 7/2005 | Kato | H01L 27/0248 |
| | | | 361/111 |
| 2006/0244496 A1* | 11/2006 | Kawakita | F02P 3/0552 |
| | | | 327/110 |
| 2010/0263644 A1* | 10/2010 | Matsuda | F02P 9/005 |
| | | | 123/625 |
| 2011/0134581 A1* | 6/2011 | Godo | F02P 3/0554 |
| | | | 361/263 |
| 2015/0041849 A1* | 2/2015 | Gillberg | F02P 17/12 |
| | | | 257/140 |
| 2015/0084533 A1* | 3/2015 | Naito | H01L 29/7395 |
| | | | 315/209 T |

* cited by examiner

SEMICONDUCTOR INTEGRATED CIRCUIT

CROSS-REFERENCE TO RELATED APPLICATION

This application is based upon and claims the benefit of priority of the prior Japanese Patent Application No. 2016-101643, filed on May 20, 2016, the entire contents of which are incorporated herein by reference.

BACKGROUND OF THE INVENTION

1. Field of the Invention

The embodiments discussed herein relate to a semiconductor integrated circuit.

2. Background of the Related Art

An ignition device in an automotive internal combustion engine includes a spark plug that ignites a mixture of fuel and air by generating an electric spark, an ignition coil that generates a high voltage applied to the spark plug, and an ignitor that drives the ignition coil. The ignitor includes a control integrated circuit (IC) and a power switch that drives the ignition coil. This control IC has a function of turning on and off the power switch in accordance with a control signal from an engine control unit (ECU) and has a function of protecting the power switch. As one of the functions of protecting the power switch, when an on-signal is continuously applied to the power switch over a certain period of time, the control IC turns off the power switch to forcibly stop the current flowing through the power switch.

This protection function of turning off the power switch is a protection function of the ignitor and is operated independently from a turn-off operation in accordance with a control signal transmitted from the engine control unit. Thus, there are cases in which the ignitor turns off the power switch at a timing different from an ignition timing based on the engine control unit. If such malfunction of the ignition timing is caused, the engine causes abnormal combustion such as backfire or knocking.

Thus, when turning off the power switch, the ignitor needs to gradually turn off the current flowing through the power switch in such a manner that the spark plug does not generate an electric spark. This operation of gradually turning off the current is referred to as a soft turn-off operation (see, for example, Japanese Laid-open Patent Publication No. 2014-238024, hereinafter "JLOPP'024").

According to JLOPP'024, the soft turn-off operation is performed by connecting a variable resistor to the gate terminal of the power switch, the variable resistor forming a voltage dividing circuit with a resistor included in an output unit that controls a power switch. When the soft turn-off operation is performed, the resistance value of the variable resistor drops step by step. Consequently, the voltage at the gate terminal of the power switch gradually drops, and the current flowing through the power switch is gradually turned off. The spark plug will not be ignited as a result of this operation.

However, the circuit for performing the soft turn-off operation according to JLOPP'024 is arranged independently from a current limiting unit that protects the power switch from an overcurrent. Thus, there is a problem that the soft turn-off operation time varies depending on the temperature characteristics of the power switch.

SUMMARY OF THE INVENTION

In one aspect, there is provided a semiconductor integrated circuit including: a soft turn-off circuit configured to receive a control signal for turning on and off a power switch and output a reference voltage whose value gradually drops from a predetermined value when the control signal for turning on the power switch is continuously supplied over a predetermined time; a current sensing circuit configured to sense a current flowing through the power switch as an input signal; and a drive circuit configured to turn on and off the power switch in accordance with the control signal and output a drive signal that limits the current flowing through the power switch in accordance with the reference voltage and a sense voltage corresponding to the current sensed by the current sensing circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
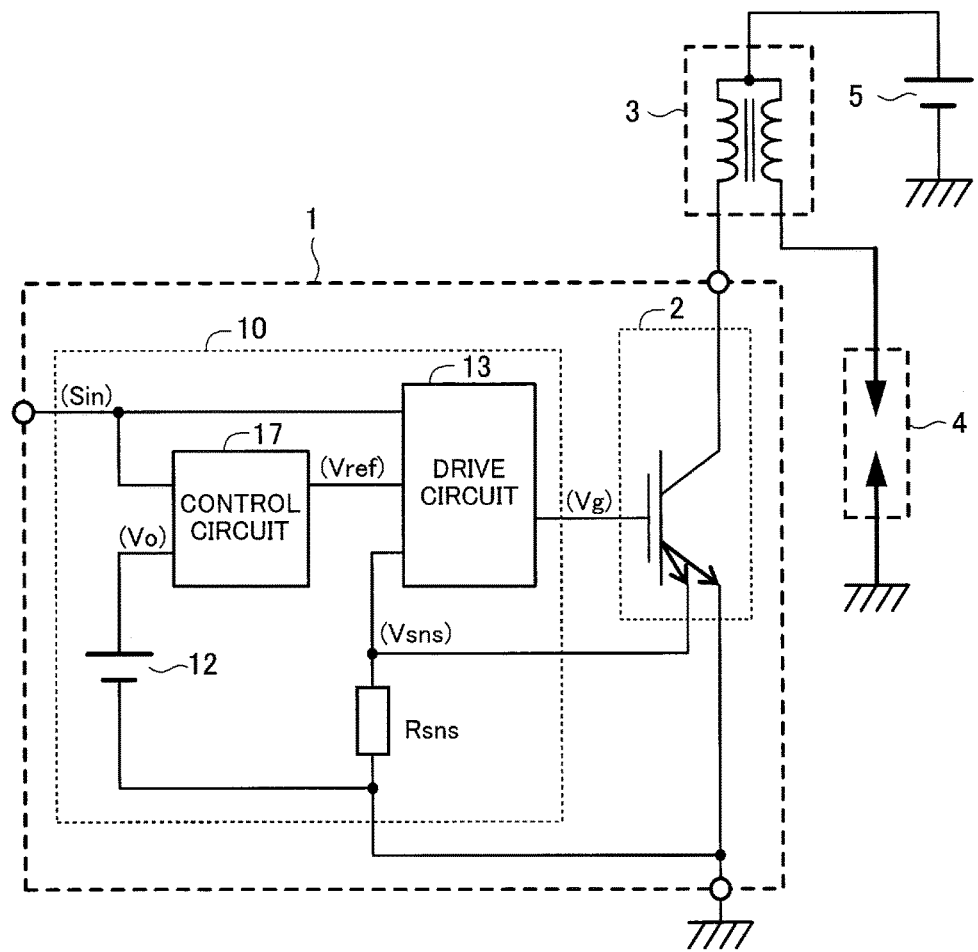
FIG. 1 illustrates an ignition device in an automotive internal combustion engine, the ignition device using a semiconductor integrated circuit, according to a first embodiment.

Hereinafter, embodiment will be described below in detail with reference to the accompanying drawings, wherein like reference characters refer to like elements throughout. The following embodiments will be described by using, as an example, an ignitor in an ignition device in an automotive internal combustion engine. An embodiment may be realized by partially combining a plurality of embodiments without causing a contradiction.

FIG. 1 illustrates an ignition device in an automotive internal combustion engine, the ignition device using a semiconductor integrated circuit, according to a first embodiment.

The ignition device includes an ignitor 1 that includes a control IC 10 and an insulated gate bipolar transistor (IGBT) 2 as a power switch. While the IGBT 2 is used as a power switch in FIG. 1, a different power switch such as a metal-oxide-semiconductor field-effect transistor (MOS-FET) may be used as a power switch.

The control IC 10 receives a signal Sin that synchronizes with a control signal from an engine control unit (this signal Sin will hereinafter be referred to as a control signal Sin) and outputs a gate voltage Vg for controlling the IGBT 2. The control IC 10 includes a control circuit 17, a reference voltage supply 12, a drive circuit 13, and a sense resistor Rsns.

The control circuit 17 receives the control signal Sin and a voltage Vo of the reference voltage supply 12. In a normal operation, the control circuit 17 outputs a reference voltage Vref having a predetermined value based on the voltage Vo of the reference voltage supply 12. In contrast, in a soft turn-off operation, the control circuit 17 outputs the reference voltage Vref having a value that gradually drops from the predetermined value.

The drive circuit 13 receives the control signal Sin, the reference voltage Vref, and a sense voltage Vsns of the sense resistor Rsns and outputs the gate voltage Vg for controlling the IGBT 2. This gate voltage Vg turns on and off the IGBT 2 on the basis of the control signal Sin in the normal operation and serves as a signal for protecting the IGBT 2 from an overcurrent on the basis of the sense voltage Vsns in an on-control operation. The gate voltage Vg also serves as a signal for performing a soft turn-off operation while protecting the IGBT 2 from an overcurrent on the basis of the sense voltage Vsns in the soft turn-off operation.

The gate voltage Vg outputted from the control IC 10 is applied to the gate terminal of the IGBT 2. The IGBT 2 includes a current sense region and a current sense terminal formed within the same chip. This current sense terminal is connected to one terminal of the sense resistor Rsns in the control IC 10. The current sense terminal and the sense resistor Rsns form a current sensing circuit that senses the current flowing through the IGBT 2. The other terminal of the sense resistor Rsns is connected to the ground. A current based on the area ratio of the main emitter region and the current sense emitter region flows through the current sense terminal of the IGBT 2 and flows to the ground via the sense resistor Rsns. Consequently, the sense voltage Vsns proportional to the emitter current is generated across the sense resistor Rsns. This sense voltage Vsns is fed back to the drive circuit 13 of the control IC 10 and is used for limiting the current flowing through the IGBT 2.

The emitter terminal of the IGBT 2 is connected to the ground, and the collector terminal of the IGBT 2 is connected to one terminal of a primary coil of an ignition coil 3. One terminal of a secondary coil of the ignition coil 3 is connected to one terminal of a spark plug 4, and the other terminal of the spark plug 4 is connected to the ground. The other terminals of the primary and secondary coils of the ignition coil 3 are connected to the positive electrode of a battery 5, and the negative electrode of the battery 5 is connected to the ground.

With the ignition device having the above configuration, when the control IC 10 receives a high (H) level control signal Sin from the engine control unit, the drive circuit 13 turns on the IGBT 2. As a result, the current supplied from the battery 5 flows to the ground via the primary coil of the ignition coil 3 and the IGBT 2, and a magnetic field is generated across the primary coil. A magnetic field is also generated across the secondary coil via the core. In this state, the drive circuit 13 indirectly senses the current flowing through the IGBT 2. Namely, a current limiting function is in operation to prevent an overcurrent from flowing through the IGBT 2.

Next, when the IGBT 2 is turned off at a predetermined timing, a voltage is generated across the primary coil by self-induction, and a high voltage is generated across the secondary coil by mutual induction. This high voltage is applied to the spark plug 4, and a spark is generated in the gap of the spark plug 4.

If the on-control gate voltage is continuously applied to the gate terminal of the IGBT 2 for a period longer than a normal on-time period, the control circuit in the control IC 10 operates to gradually drop the reference voltage Vref supplied to the drive circuit 13. Namely, in addition to the above current limiting function by the drive circuit 13, since the reference voltage Vref gradually drops, the voltage generated across the secondary coil of the ignition coil 3 will not exceed the voltage that causes a spark in the gap of the spark plug 4. Thus, this ignition device generates no spark in the gap of the spark plug 4 at an unnecessary timing and drops the current flowing through the IGBT 2 to zero within a soft turn-off operation.

In the soft turn-off time, the drive circuit 13 performs a soft turn-off operation while monitoring the current flowing through the IGBT 2. Thus, the first embodiment provides an advantageous effect that a certain soft turn-off time is ensured irrespective of the threshold temperature characteristics of the IGBT 2.

Figure 2:
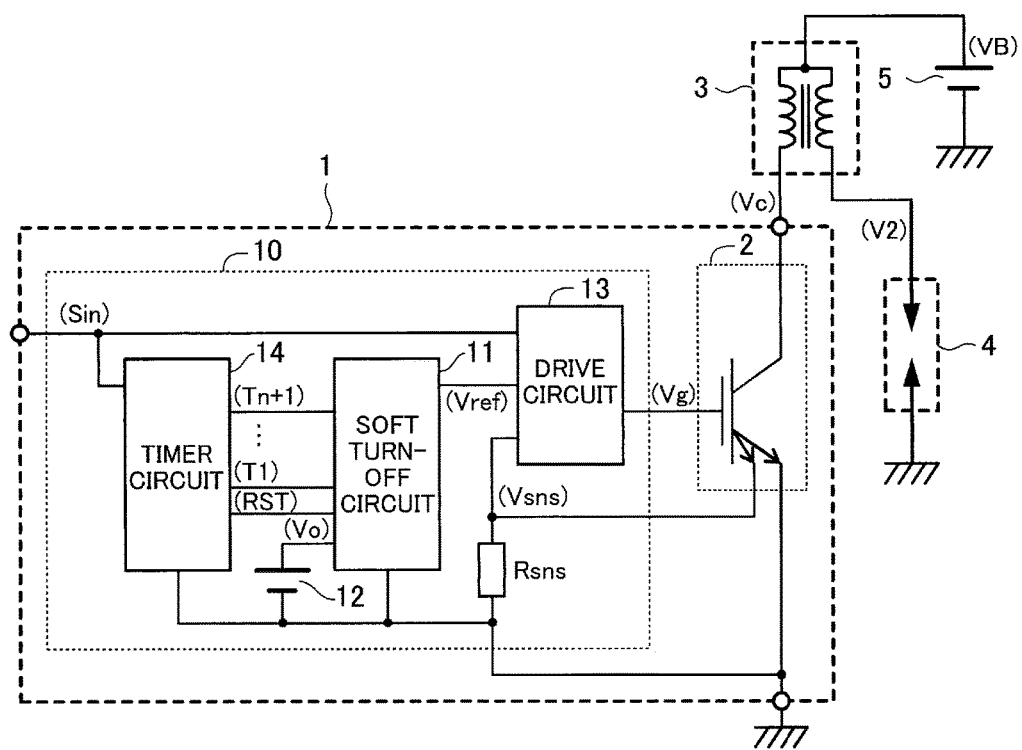
FIG. 2 illustrates an ignition device in an automotive internal combustion engine, the ignition device using a semiconductor integrated circuit, according to a second embodiment.

FIG. 2 illustrates an ignition device in an automotive internal combustion engine, the ignition device using a semiconductor integrated circuit, according to a second embodiment. The constituent elements in FIG. 2 that are the same as or equivalent to those in FIG. 1 will be denoted by the same reference characters, and detailed description thereof will be omitted.

In the second embodiment, a control IC 10 includes, in the control circuit 17, a soft turn-off circuit 11 and a timer circuit 14. The timer circuit 14 has a function of measuring time taken until a soft turn-off operation starts and a function of measuring a soft turn-off time in which the soft turn-off circuit 11 performs a soft turn-off operation.

Namely, when the control IC 10 receives a High-level (H-level) control signal Sin from an engine control unit, the timer circuit 14 starts the time measurement operation. In a normal operation, the control IC 10 stops the time measurement operation when the control IC 10 receives a low-level (L-level) control signal Sin while the timer circuit 14 is performing the time measurement operation.

When the control IC 10 continuously receives the H-level control signal Sin after the timer circuit 14 ends the time measurement operation, the timer circuit 14 resets the time measurement operation and starts measuring the soft turn-off time. The soft turn-off circuit 11 generates and applies a reference voltage Vref to a drive circuit 13 so that the current flowing through an IGBT 2 drops to zero within the soft turn-off time set by the timer circuit 14. The drive circuit 13 generates and applies a gate voltage Vg to the gate terminal of the IGBT 2 so that the current flowing through the IGBT 2 drops to zero within the soft turn-off time. Since the soft turn-off time is ensured on the basis of a value obtained by the timer circuit 14, the soft turn-off circuit 11 is always able to accurately obtain a certain soft turn-off time. In addition, since the timer circuit 14 is configured to measure both the time taken until a soft turn-off operation starts and the soft turn-off time, the chip size of the control IC 10 can be reduced.

Next, a specific configuration example of the control IC 10 will be described.

Figure 3:
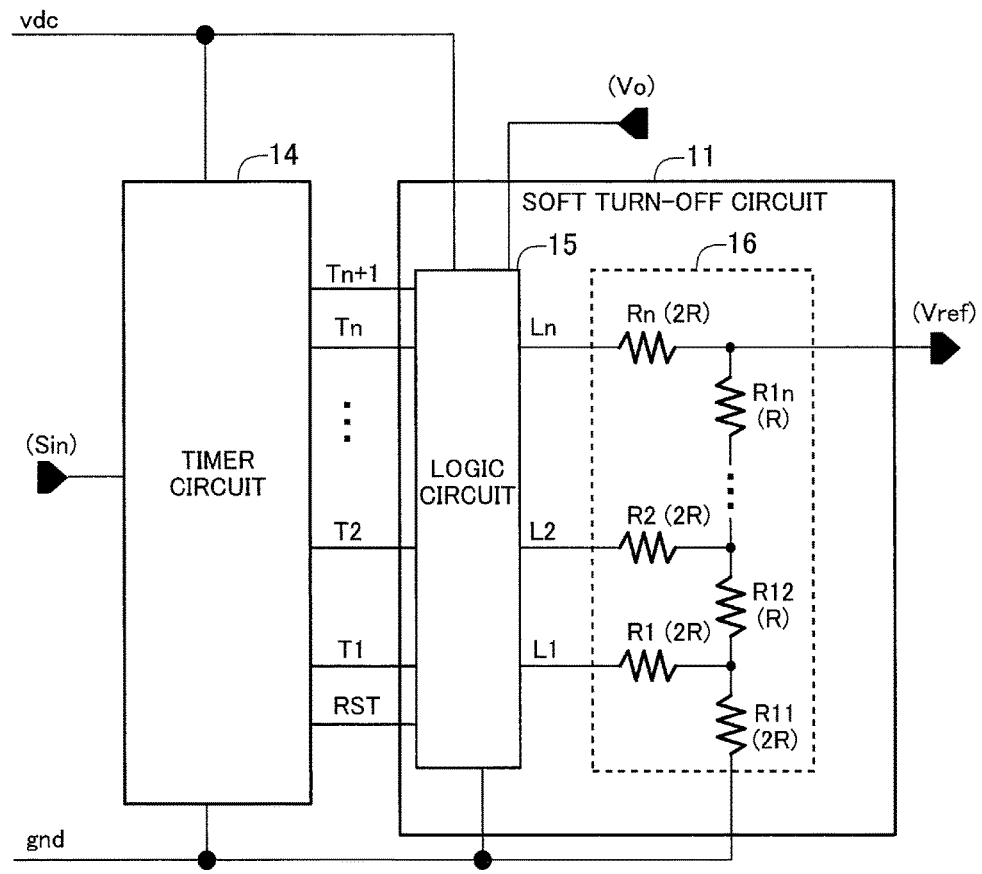
FIG. 3 illustrates a configuration example of a timer circuit and of a soft turn-off circuit.
Figure 4:
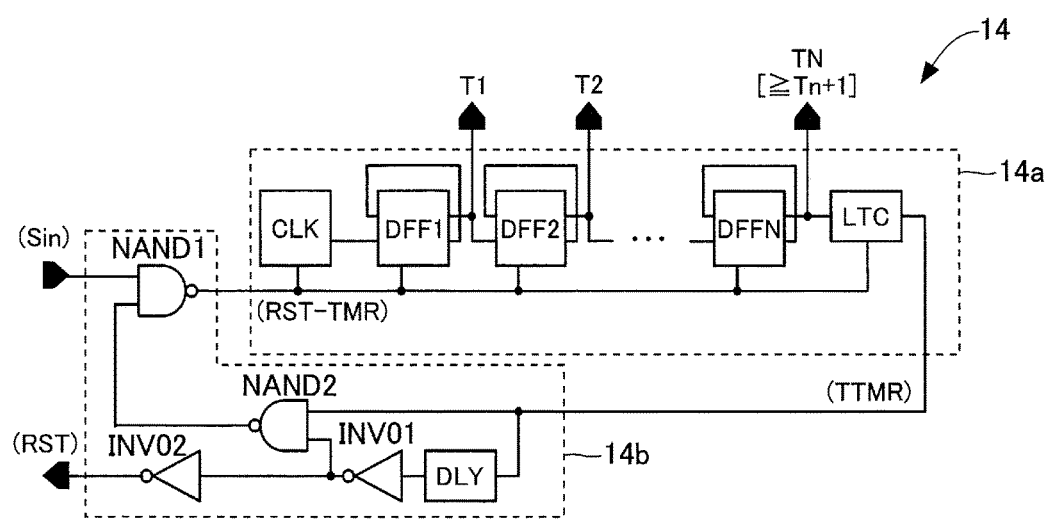
FIG. 4 illustrates a specific configuration example of the timer circuit.
Figure 5:
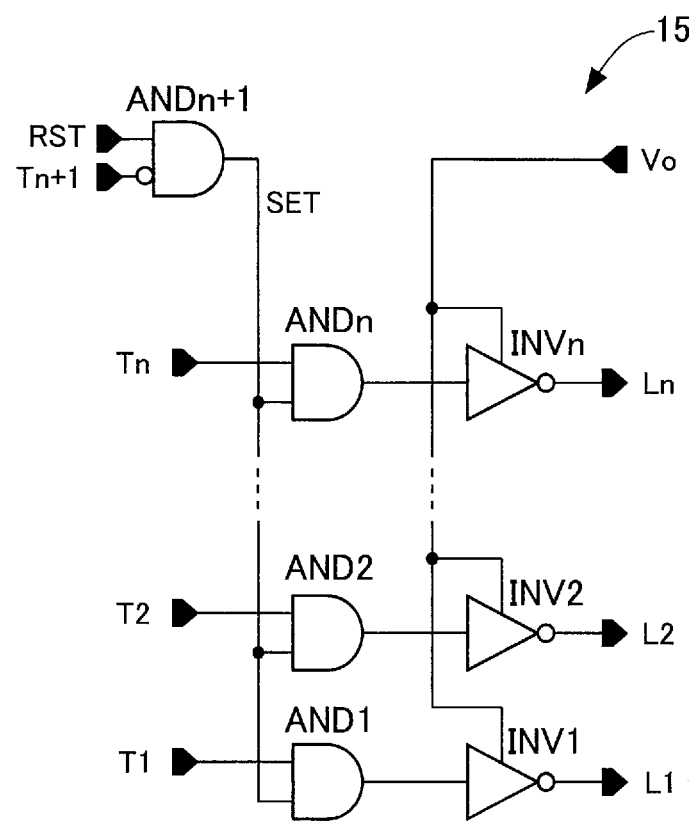
FIG. 5 illustrates a configuration example of a logic circuit of the soft turn-off circuit.
Figure 6:
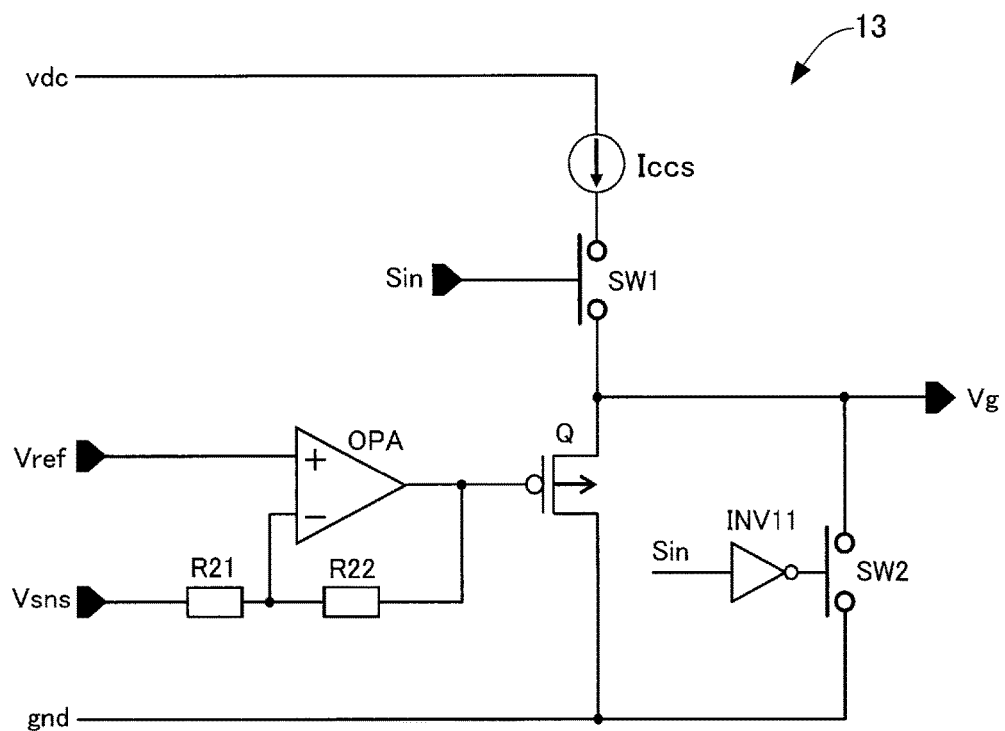
FIG. 6 illustrates a configuration example of a drive circuit.

FIG. 3 illustrates a configuration example of the timer circuit 14 and of the soft turn-off circuit 11. FIG. 4 illustrates a specific configuration example of the timer circuit 14. FIG. 5 illustrates a configuration example of a logic circuit 15 of the soft turn-off circuit 11. FIG. 6 illustrates a configuration example of the drive circuit 13.

FIG. 3 illustrates the timer circuit 14 and the soft turn-off circuit 11 included in the control IC 10. The timer circuit 14 receives a control signal Sin from the engine control unit and outputs (n+1) signals T1 to Tn+1 and a reset signal RST. The timer circuit 14 is connected to a power supply line vdc and a ground line gnd.

The soft turn-off circuit 11 includes the logic circuit 15 and a resistor ladder circuit 16. The logic circuit 15 receives the signals T1 to Tn+1 and the reset signal RST from the timer circuit 14 and outputs signals L1 to Ln. In addition, the logic circuit 15 receives a voltage Vo of a reference voltage supply 12 and is connected to the power supply line vdc and the ground line gnd.

The resistor ladder circuit 16 receives the signals L1 to Ln from the logic circuit 15 and outputs the reference voltage Vref. The reference voltage Vref is supplied from the resistor ladder circuit 16 to the drive circuit 13. The resistor ladder circuit 16 is also connected to the ground line gnd.

As illustrated in FIG. 4, the timer circuit 14 includes a counter circuit 14a and a reset circuit 14b. The counter circuit 14a includes a clock circuit CLK, N D flip flops DFF1 to DFFN, and a latch circuit LTC connected in series with each other. In FIG. 4, the N stages of D flip flops DFF1 to DFFN are connected in series with each other, forming an N-bit counter. Namely, the output from the clock circuit CLK is connected to the clock input terminal of the D flip flop DFF1. The D flip flop DFF1 outputs the signal T1 via its output terminal, and this output terminal is connected to the clock input terminal of the next D flip flop DFF2. The D flip flop DFF1 has an inverting output terminal connected to its D input terminal. The second D flip flop DFF2 to the (N−1)th D flip flop DFFN−1 are configured in the same way. The most-downstream D flip flop DFFN has its output terminal connected to the input terminal of the next latch circuit LTC. The D flip flop DFFN has an inverting output terminal connected to its D input terminal. The output terminal of the latch circuit LTC serves as the output terminal of the counter circuit 14a and outputs a signal TTMR. In addition, each of the clock circuit CLK, the D flip flops DFF1 to DFFN, and the latch circuit LTC of the counter circuit 14a has a reset input terminal that receives a timer reset signal RST-TMR. This counter circuit 14a is configured to have a number of stages to measure the time taken until the soft turn-off circuit 11 starts a soft turn-off operation.

If the time taken until the soft turn-off circuit 11 starts a soft turn-off operation and the soft turn-off time in which the soft turn-off circuit 11 performs the soft turn-off operation are the same (N=n+1), the signals outputted from the individual output terminals of the D flip flops DFF1 to DFFN are used as the signals T1 to Tn+1. Namely, in this case, the D flip flop DFFN outputs the signal Tn+1 from its output terminal.

If the soft turn-off time in which the soft turn-off circuit 11 performs the soft turn-off operation is shorter than the time taken until which the soft turn-off circuit 11 starts the soft turn-off operation (N>n+1), the (n+1) D flip flops DFF1 to DFFn+1 of the N D flip flops DFF1 to DFFN are used.

The reset circuit 14b includes NAND circuits NAND1 and NAND2, a delay circuit DLY, and inverter circuits INV01 and INV02. The NAND circuit NAND1 receives the control signal Sin from the engine control unit via one of its input terminals. The other input terminal of the NAND circuit NAND1 is connected to the output terminal of the NAND circuit NAND2. One of the input terminals of the NAND circuit NAND2 receives the signal TTMR outputted from the counter circuit 14a. This signal TTMR is also supplied to the input terminal of the delay circuit DLY. The output terminal of the delay circuit DLY is connected to the input terminal of the inverter circuit INV01, and the output terminal of the inverter circuit INV01 is connected to the other input terminal of the NAND circuit NAND2 and to the input terminal of the inverter circuit INV02. The output terminal of the inverter circuit INV02 serves as the output terminal of this reset circuit 14b and outputs the reset signal RST.

As illustrated in FIG. 5, the logic circuit 15 of the soft turn-off circuit 11 includes (n+1) AND circuits AND1 to ANDn+1 and n inverter circuits INV1 to INVn. The AND circuits AND1 to ANDn receive the signals T1 to Tn, outputted from the counter circuit 14a of the timer circuit 14, via their respective input terminals. The AND circuits AND1 to ANDn receive a set signal SET, outputted from the output terminal of the AND circuit ANDn+1, via their respective other input terminals. The AND circuit ANDn+1 receives the reset signal RST, outputted from the reset circuit 14b of the timer circuit 14, via its input terminal. The AND circuit ANDn+1 receives the signal Tn+1 outputted from the timer circuit 14 via its inverting input terminal. The output terminals of the AND circuits AND1 to ANDn are connected to the input terminals of the inverter circuits INV1 to INVn, respectively. The output terminals of the inverter circuits INV1 to INVn serve as the output terminals of this logic circuit 15 and output signals L1 to Ln. The inverter circuits INV1 to INVn receive the voltage Vo of the reference voltage supply 12 as their power supply and output binary signals L1 to Ln, respectively. Each of the binary signals L1 to Ln represents the voltage Vo or the ground potential.

As illustrated in FIG. 3, the resistor ladder circuit 16 is a digital-to-analog (D/A) converter configured by latter-structured resistors. More specifically, one terminal of a resistor R1 receives the signal L1, and the other terminal of the resistor R1 is connected to the ground via a resistor R11. One terminal of a resistor R2 receives the signal L2, and the other terminal of the resistor R2 is connected to the connection point of the resistors R1 and R11 via the resistor R12. The other resistors (up to a pair of resistors Rn and R1n) in the resistor ladder circuit 16 are configured in the same way. The connection point of the resistor Rn and the resistor R1n serves as the output terminal of the resistor ladder circuit 16. The reference voltage Vref generated by the resistor ladder circuit 16 is supplied to the drive circuit 13. Each of the resistors R1 to Rn and R11 has a resistance value of 2R, and each of the resistors R12 to R1n has a resistance value of R.

As illustrated in FIG. 6, the drive circuit 13 includes a constant current source Iccs having one terminal connected to the power supply line vdc. The other terminal of the constant current source Iccs is connected one terminal of a switch SW1, and the other terminal of the switch SW1 is connected to the source terminal of a transistor Q and one terminal of a switch SW2. In FIG. 6, the transistor Q is a P channel MOSFET. The drain terminal of the transistor Q and the other terminal of the switch SW2 are connected to the ground line gnd. The control input terminal of the switch SW2 is connected to the output terminal of an inverter circuit INV11. The control signal Sin from the engine control unit is supplied to the input terminal of the inverter circuit INV11 and the control input terminal of the switch SW1. The other terminal of the switch SW1, the source terminal of the transistor Q, and one terminal of the switch SW2 form the output terminal of the drive circuit 13 and output the gate voltage Vg to the IGBT 2.

The gate terminal of the transistor Q is connected to the output terminal of an operational amplifier OPA. The operational amplifier OPA has an inverting output terminal that receives the reference voltage Vref outputted from the resistor ladder circuit 16 of the soft turn-off circuit 11. The inverting output terminal of the operational amplifier OPA is connected to the point at which one terminal of a resistor R21 and one terminal of a resistor R22 are connected to each other. The other terminal of the resistor R21 receives the sense voltage Vsns sensed by the sense resistor Rsns, and the other terminal of the resistor R22 is connected to the output terminal of the operational amplifier OPA.

This operational amplifier OPA limits the current flowing through the IGBT 2 when receiving the sense voltage Vsns and determining that the current flowing through the IGBT 2 exceeds a predetermined value. In addition, this operational amplifier OPA limits the current flowing through the IGBT 2, depending on the variable reference voltage Vref.

Next, operations of the ignition device in the automotive internal combustion engine having the above configuration will be described.

Figure 7:
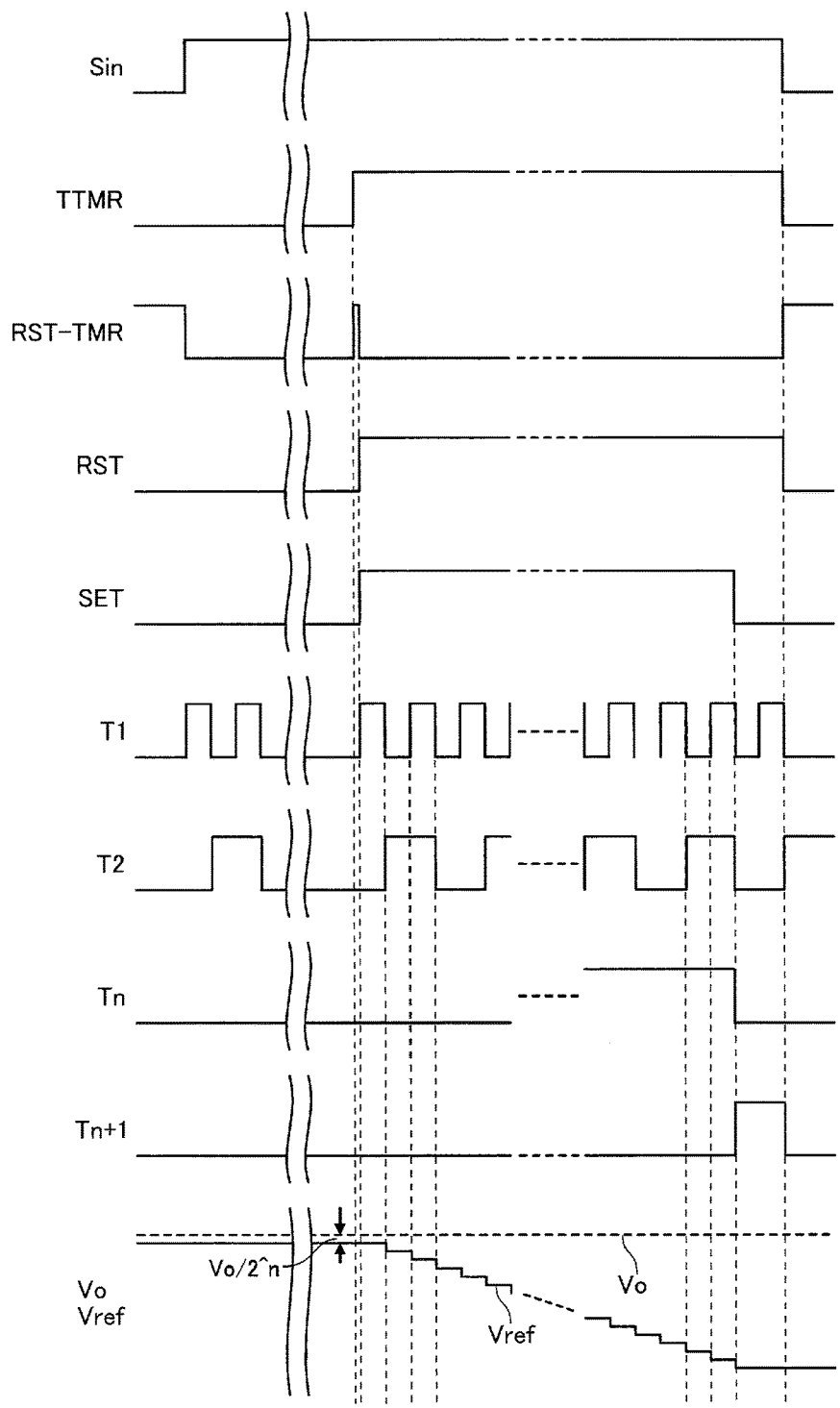
FIG. 7 illustrates waveforms of main portions for describing operations of the timer circuit and the soft turn-off circuit.
Figure 8:
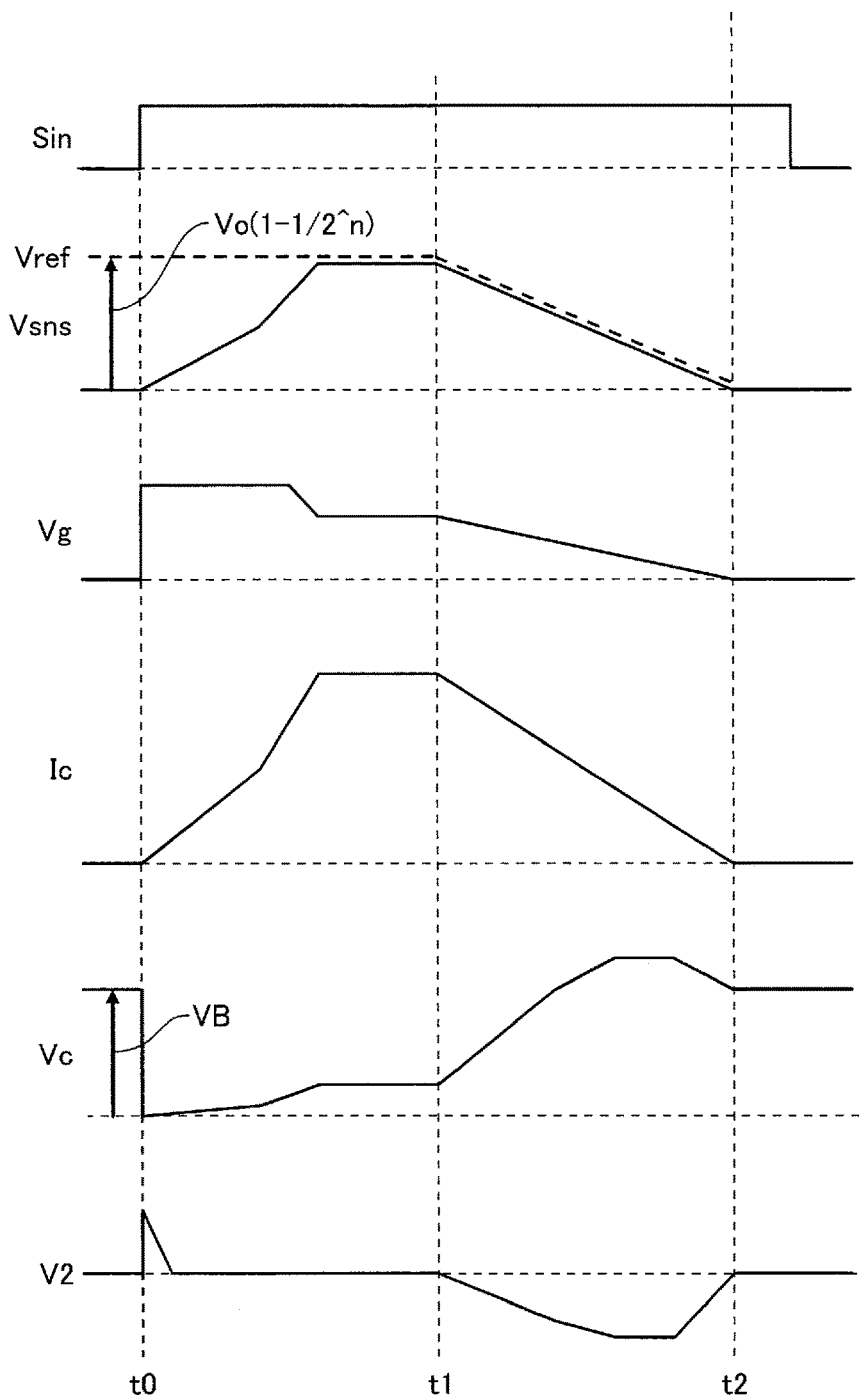
FIG. 8 illustrates waveforms of main portions for describing operations of the ignition device.

FIG. 7 illustrates waveforms of main portions for describing operations of the timer circuit and the soft turn-off circuit. FIG. 8 illustrates waveforms of main portions for describing operations of the ignition device.

First, as illustrated in FIG. 7, when the control signal Sin supplied from the engine control unit is set to the L level, the IGBT 2 is turned off. In contrast, when the control signal Sin is set to the H level, the IGBT 2 is turned on.

When the engine control unit supplies the L-level control signal Sin, the L-level control signal Sin is supplied to the NAND circuit NAND1 of the reset circuit 14b of the timer circuit 14. As a result, the reset circuit 14b outputs an H-level timer reset signal RST-TMR and maintains the counter circuit 14a in a reset state. Thus, all the signals T1 to Tn+1 outputted from the counter circuit 14a are at the L level.

When receiving the L-level signals T1 to Tn, the AND circuits AND1 to ANDn of the logic circuit 15 in the soft turn-off circuit 11 output an L-level signal. Thus, the inverter circuits INV1 to INVn output the voltage Vo. Consequently, the resistor ladder circuit 16 outputs the maximal reference voltage Vref, which is $Vo(1-\frac{1}{2}^n)$.

When the drive circuit 13 receives the L-level control signal Sin, the switch SW1 is turned off and the switch SW2 is turned on. Thus, the gate voltage Vg is at the ground level. In this state, the sense voltage Vsns is at the ground level, and the reference voltage Vref supplied to the non-inverting input terminal of the operational amplifier OPA is at its maximal value. Thus, the operational amplifier OPA outputs a voltage signal close to the power supply voltage and maintains the transistor Q in an off-state.

Next, when the control signal Sin is brought to the H level, the NAND circuit NAND1 of the reset circuit 14b in the timer circuit 14 outputs an L-level timer reset signal RST-TMR, which causes the counter circuit 14a to start performing the time measurement operation. Namely, the N stages of D flip flops DFF1 TO DFFN start to sequentially divide the frequency of the clock signal outputted from the clock circuit CLK.

If the H-level control signal Sin is continuously supplied over the ignition time in a normal operation, the counter circuit 14a ends the time measurement operation. Consequently, the signal TTMR and the timer reset signal RST-TMR are brought to the H level. As a result, the counter circuit 14a is reset and starts to measure the soft turn-off time.

After the signal TTMR is brought to the H level and the delay time set by the delay circuit DLY elapses, the timer reset signal RST-TMR is brought to the L level. Simultaneously, the reset signal RST is brought to the H level.

Consequently, the AND circuit ANDn+1 of the logic circuit 15 in the soft turn-off circuit 11 receives the H-level reset signal RST and the signal Tn+1. Immediately after the start of the time measurement operation, the signal Tn+1 is still at the L level. Since the AND circuit ANDn+1 receives the signal Tn+1 via its inverting input terminal, the AND circuit ANDn+1 outputs an H-level set signal SET and allows passage of the signals T1 to Tn.

Next, the n-bit signals T1 to Tn obtained by the counter circuit 14a dividing the frequency of the clock signal are supplied from the inverter circuit INV1 to INVn to the resistor ladder circuit 16 as the inverted and synchronized signals L1 to Ln.

The resistor ladder circuit 16 performs D/A conversion on the signals L1 to Ln and outputs the reference voltage Vref. This reference voltage Vref is maintained at its initial value $Vo(1-\frac{1}{2}^n)$ until the counter circuit 14a ends the time measurement operation. When the counter circuit 14a ends the time measurement operation and starts measuring the soft turn-off time, the reference voltage Vref drops by $Vo(\frac{1}{2}^n)$ per clock cycle.

The logic circuit 15 outputs the H-level set signal SET from when the AND circuit ANDn+1 receives the reset signal RST to when the AND circuit ANDn+1 receives the signal Tn+1, and this period is the soft turn-off time.

Next, operations of the ignition device during the soft turn-off operation will be described with reference to FIG. 8.

First, when an L-level control signal Sin is supplied from the engine control unit, the gate voltage Vg and a collector current Ic of the IGBT 2 are maintained zero. In addition, a collector voltage Vc of the IGBT 2 is the same as the voltage VB of the battery 5. In addition, since the IGBT 2 is off, the sense voltage Vsns, which is a voltage obtained by converting the current flowing through the IGBT 2, is zero, and the voltage V2 applied to the spark plug 4 is also zero. In this state, the soft turn-off circuit 11 outputs the reference voltage Vref having its initial value $Vo(1-\frac{1}{2}^n)$.

When an H-level control signal Sin is supplied at time t0, the gate voltage Vg rises, and the IGBT 2 turns on. Consequently, the collector voltage Vc of the IGBT 2 drops, and the collector current Ic rises. However, since the load of the IGBT 2 is a coil, the collector current Ic gradually rises. The sense voltage Vsns also rises with the collector current Ic. Normally, the IGBT 2 turns off while the collector current Ic is rising, and at this timing, a spark is generated in the gap of the spark plug 4. However, FIG. 8 assumes that the IGBT 2 continues to remain turned on while the collector current Ic is rising.

When the ignition coil 3 reaches magnetic saturation while the collector current Ic is rising, the impedance of the ignition coil 3 drops. Consequently, the collector current sharply rises, and the sense voltage Vsns also rises in the same way.

The drive circuit 13 compares this sense voltage Vsns with the reference voltage Vref. Thus, when the sense voltage Vsns rises close to the reference voltage Vref, the gate voltage Vg drops, whereby the collector current Ic flowing through the IGBT 2 is prevented from rising further.

Next, when the N stages of D flip flops DFF1 TO DFFN in the counter circuit 14a of the timer circuit 14 end the time measurement operation at time t1, the (n+1) stages of D flip flops DFF1 to DFFN+1 of the counter circuit 14a start to measure the soft turn-off time. The soft turn-off circuit 11 outputs the reference voltage Vref having an analog value on the basis of the signals T1 to Tn outputted from the counter circuit 14a. Since this reference voltage Vref drops per clock cycle, the output from the operational amplifier OPA accordingly drops. Namely, the on-resistance of the transistor Q drops, and the gate voltage Vg gradually drops.

Since the gate voltage Vg gradually drops, the collector current Ic also drops, and the collector voltage Vc rises. Since the collector current Ic gradually drops over time, the collector voltage Vc gradually rises, and the voltage V2 applied to the spark plug 4 gradually drops. As a result, since the collector voltage Vc does not sharply rise and the voltage V2 applied to the spark plug 4 does not sharply drop, the energy is released without discharge of a spark. Namely, the spark plug 4 does not discharge an electrical current.

In addition, since the control IC 10 performs this soft turn-off operation while monitoring the current flowing through the IGBT 2, a certain soft turn-off time is ensured irrespective of the threshold temperature characteristics of the IGBT 2.

Next, when the gate voltage Vg falls below the threshold voltage of the IGBT 2 at time t2, the IGBT 2 turns off. Thus, the collector current Ic reaches zero, and the collector voltage Vc reaches the voltage VB of the battery 5. Consequently, the voltage V2 applied to the spark plug 4 reaches zero.

A different current limiting method other than a method in which a shunt resistor is connected in series with a main IGBT 2 and a method in which a resistor is connected to a sense IGBT having the same configuration as the IGBT 2 may be used.

While the resistor ladder circuit 16 specialized in small resolution has been described as a variable resistor, a different resistance value varying method may be used.

In addition, while the control IC 10 additionally includes the resistor ladder circuit 16, the reset circuit 14b of the timer circuit 14, and signal wirings connecting the above circuits, downsizing can easily be achieved by using the counter circuit 14a for two purposes and using a digital circuit configuration. In addition, by using a digital circuit and a good base clock, accurate and stable characteristics are ensured in terms of the temperature dependence and the power supply voltage dependence.

Figure 9:
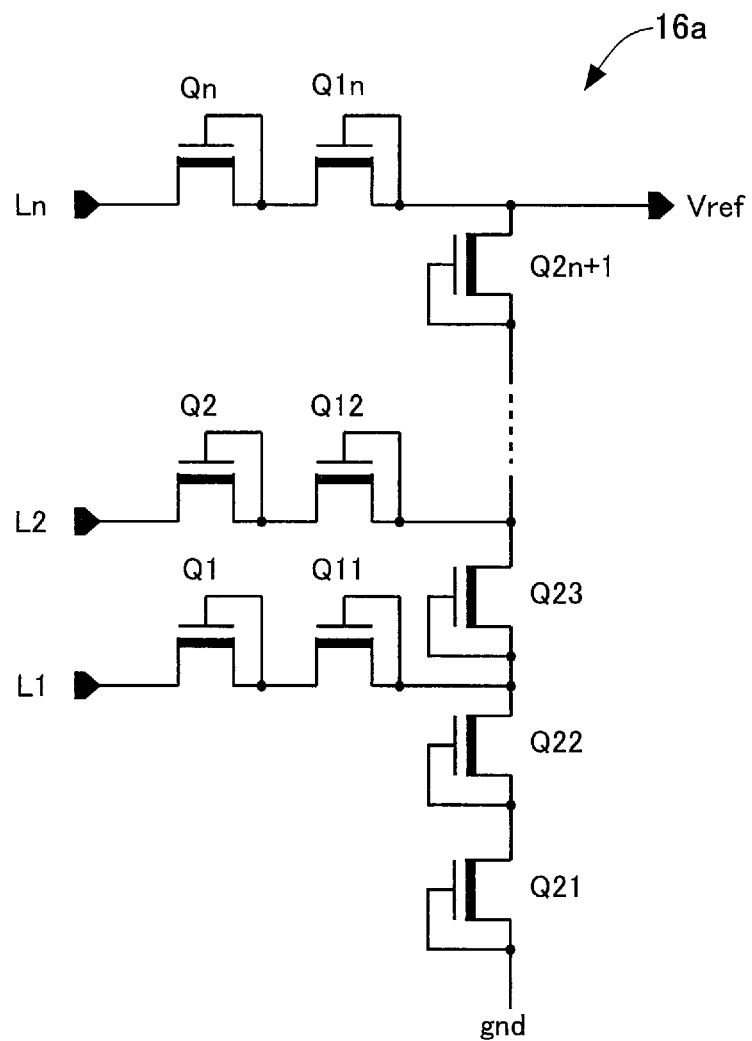
FIG. 9 is a circuit diagram illustrating a digital-to-analog (D/A) converter in a soft turn-off circuit in a semiconductor integrated circuit according to a third embodiment.

FIG. 9 is a circuit diagram illustrating a D/A converter in a soft turn-off circuit in a semiconductor integrated circuit according to a third embodiment.

This D/A converter 16a is used as the resistor ladder circuit 16 in the soft turn-off circuit 11 in the semiconductor integrated circuit according to the second embodiment. Namely, this D/A converter 16a includes MOS transistors Q1 to Qn, Q11 to Q1n, and Q21 to Q2n+1 to form the region of the resistors R1 to Rn and R11 to R1n in the resistor ladder circuit 16. These MOS transistors Q1 to Qn, Q11 to Q1n, and Q21 to Q2n+1 are depletion-type MOS transistors, create a predetermined on-resistance, and are configured in the same way. Thus, an individual transistor corresponding to the resistance value of 2R is realized by connecting one of the MOS transistors Q1 to Qn and one of the MOS transistors of Q11 to Q1n in series with each other. An individual transistor corresponding to the resistance value of R is realized by one of the MOS transistors Q21 to Q2n+1.

These MOS transistors Q1 to Qn, Q11 to Q1n, and Q21 to Q2n+1 of the D/A converter 16a occupy a smaller area of the semiconductor chip than the resistors of the resistor ladder circuit 16.

Since the semiconductor integrated circuit having the above configuration performs a soft turn-off operation while monitoring the current flowing through the power switch, the semiconductor integrated circuit has an advantageous effect that a certain soft turn-off time is ensured irrespective of the threshold temperature characteristics of the power switch.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor integrated circuit for controlling a power switch in accordance with a control signal, the control signal being at one of a first level and a second level for respectively turning on and off the power switch, the semiconductor integrated circuit comprising:
    a control circuit configured to receive the control signal to thereby output a reference voltage, a value of which gradually drops from a predetermined value when the received control signal remains at the first level for a predetermined time;
    a current sensing circuit configured to sense a current flowing through the power switch; and
    a drive circuit configured to receive the control signal and the reference voltage to thereby output a drive signal, the drive signal limiting the current flowing through the power switch in accordance with the reference voltage and a sense voltage corresponding to the current sensed by the current sensing circuit,
    wherein the control circuit includes a timer circuit, which is configured
        to measure a time from when the received control signal switches to the first level, and
        immediately after the measured time reaches the predetermined time, to measure a soft turn-off time during which the value of the reference voltage gradually drops, and
    wherein the timer circuit includes
        a multistage counter circuit configured to measure the time, and
        a reset circuit configured to reset the multistage counter circuit, immediately after the measured time reaches the predetermined time, to start the measurement of the soft turn-off time.

2. The semiconductor integrated circuit according to claim 1, wherein the timer circuit measures the soft turn-off time by using at least a part of the multistage counter circuit.

3. The semiconductor integrated circuit according to claim 1, wherein the control circuit includes a digital-to-analog converter configured to convert a digital signal outputted from the multistage counter circuit of the timer circuit into an analog value, and to output the analog value as the reference voltage.

4. The semiconductor integrated circuit according to claim 3, wherein the digital-to-analog converter is configured by a resistor ladder circuit.

5. The semiconductor integrated circuit according to claim 4, wherein the resistor ladder circuit includes a plurality of depletion-type metal-oxide-semiconductor (MOS) transistors.

* * * * *